E. B. LANE.
ELECTROMAGNET AND VALVE.
APPLICATION FILED OCT. 6, 1916.
1,389,056.
Patented Aug. 30, 1921.
2 SHEETS—SHEET 1.
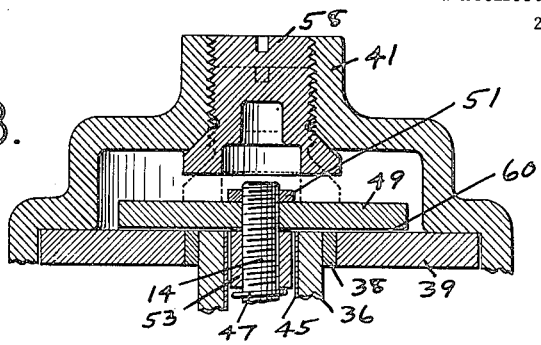
Fig. 3.
Fig. 1.
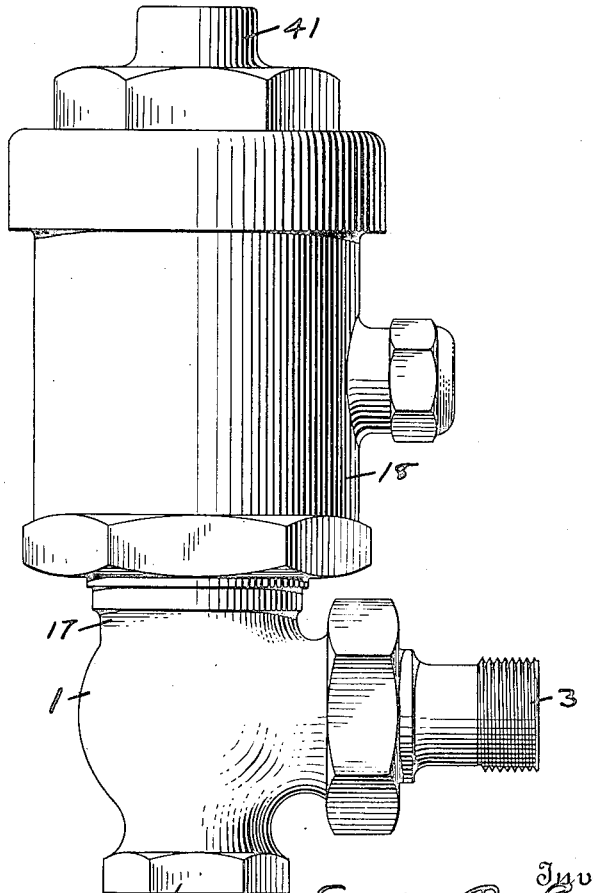
Inventor
Edwin B. Lane,
By his Attorneys
Emery, Booth, Janney & Varney

UNITED STATES PATENT OFFICE.

EDWIN B. LANE, OF WEST HOBOKEN, NEW JERSEY.

ELECTROMAGNET AND VALVE.

1,389,056.  Specification of Letters Patent.  Patented Aug. 30, 1921.

Application filed October 6, 1916. Serial No. 124,048.

*To all whom it may concern:*

Be it known that I, EDWIN B. LANE, a citizen of the United States, and a resident of West Hoboken, in the county of Hudson and State of New Jersey, have invented an Improvement in Electromagnets and Valves, of which the following is a specification.

This invention relates to an electromagnet and valve, and with regard to certain more specific features, to an electrically operated device for controlling the flow of fluids.

One of the objects of the invention is to provide a simple and inexpensive mechanism for regulating the flow of a fluid.

Another object is to provide a device for opening and closing a fluid passage with certainty of operation, and freedom from deterioration in service.

Another object is to provide an electromagnet in which the several parts may be inexpensively constructed and assembled without requiring a high degree of accuracy in dimensions.

Another object is to provide an electrically operated valve readily adjusted to meet varying service conditions, and easily disassembled in case of inspection or repair.

Another object is to provide an electromagnetic device in which the flux is distributed in a manner conducive to efficient and reliable operation, and in which there is a minimum liability of failure in service.

Other objects will be in part obvious and in part pointed out hereinafter.

The invention accordingly comprises the features of construction, combinations of elements, and arrangements of parts which are exemplified in the structure hereinafter described and the scope of the application of which will be indicated in the following claims.

In the accompanying drawings, in which is shown one of various possible embodiments of this invention, Figure 1 is an elevation of a preferred type of solenoid and valve operated thereby.

Fig. 3 is a fragmentary sectional elevation, showing the cap screwed down, and a portion of the mechanism associated therewith.

Similar reference characters indicate similar parts throughout the several views of the drawings.

Figure 2:
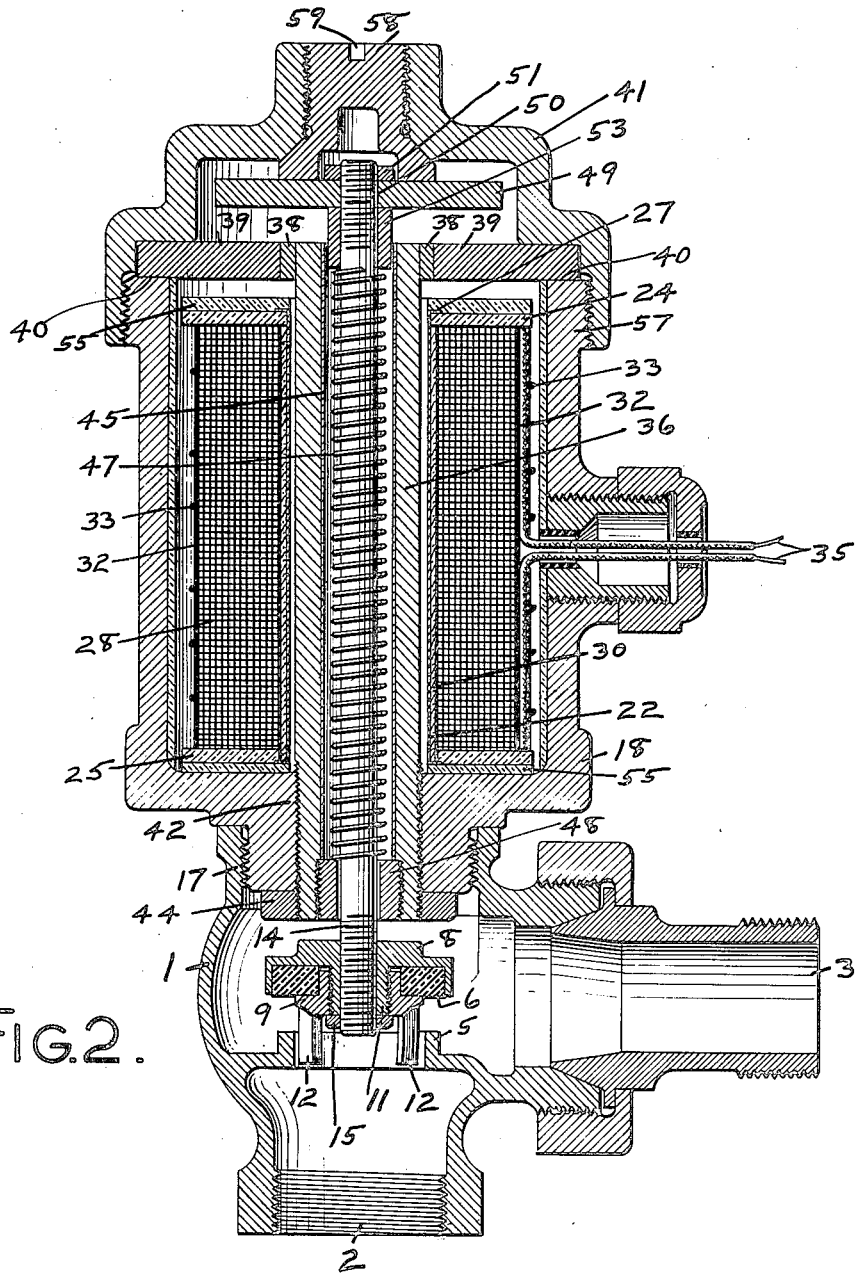
Fig. 2 is a vertical section showing the valve in its normal or open position.

In considering this invention in its relation to the prior art, it may be noted that for many years attempts have been made to regulate automatically and reliably the flow of a fluid, such as air or steam. For this purpose, various types of valve-operating mechanism have been devised, including electrically-controlled devices, to which the present invention more particularly relates. In magnetically operated valves, it has been found that the temperature conditions in the fluid or the vapor content or chemical characteristics of the fluid have caused deterioration or unreliable operation of the magnet; furthermore, the amount of electrical energy required for effective opening and closing of the valve has restricted the field of usefulness of magnetic control, and this low efficiency has been due to electrical, magnetic and mechanical defects. The weight of moving parts, for example, has detracted from the efficiency of the entire device; magnetic leaks or excessive reluctance of a poor distribution of the flux has prevented the magnetic efficiency from obtaining a satisfactory value; and the binding of movable parts, due to distortion in severe service or to other causes, has contributed to the low efficiency of many if not all of the electrically-operated valves heretofore devised. And this lack of effective and reliable operation without the application of any excessive amount of current has made this type of valve so expensive in first cost and cost of maintenance, that the valve has found only a comparatively small range of utility. In many fields, such as temperature control by thermostats, and in other uses where economy and reliability and low current consumption are prime factors, there has long been a demand for an inexpensive and effective magnetically-controlled valve. As the description progresses, it will be seen that these defects of prior apparatus are eliminated and the above requirements and desiderata are adequately met in the mechanism of the present invention.

Referring now to the accompanying drawings, there is illustrated a valve 1 comprising the inlet and outlet apertures 2, 3, respectively, the valve seat 5, rubber disk 6, and disk holder 8. A nut 9 provided with internal threads meshing with external threads in the central extension 11 of the disk holder 8, carries the projecting prongs or guides 12, which serve to direct the movement of the valve and insure accurate seating of the rubber disk 6 each time the valve is closed. The central extension 11 of the disk holder 8 is internally threaded to receive a stem or other operating device, in this case a threaded stem 14. The adjustment of the stem with respect to the disk holder 8 of the valve may be made by loosening the lock nut 15, threading the stem into or out of the disk holder through the required distance, and again tightening the lock nut 15.

Threaded into the beading 17 in the upper portion of the valve 1 is the magnetic shell or casing 18 carrying the mechanism for effecting the reciprocation of the stem 14, to open and close the valve. Within this shell is an electromagnet wound upon a non-magnetic bobbin or sleeve 22, and two vulcan asbestos disks 24, 25, arranged at either end of the non-magnetic brass sleeve 22 and retained in place upon said sleeve by bending over the ends of the sleeve, as indicated at 27, Fig. 2. The windings 28 of the magnet are protected from contact with the sleeve 22 by a layer of mica 30, which preferably extends the entire length of the windings and between the sleeve 22 and the asbestos disks 24, 25, in order to prevent any of the wires of the coil 28 from accidentally contacting with the sleeve during the winding operation or in service in case the sleeve becomes heated and expands axially. The windings 28 are bound with asbestos 32 impregnated with soluble glass, and suitable heat-resisting means, such as the asbestos twine 33, serves to hold the impregnated asbestos in place. Leads 35 extend from the windings 28 to the exterior of the device, to connect the magnet to a suitable source of power, not shown.

Within the magnet is a magnetic pole piece 36 carrying at its upper end a brass or other non-magnetic disk 38, and flush therewith a larger magnetic disk 39. This disk 39 serves the double purpose of effecting a tight joint at the annulus 40, where it rests upon the upper face of the shell 18, and of forming part of the magnetic circuit of the apparatus. As indicated in Fig. 2, the lower threaded portion of this pole piece 36 is threaded into the lower portion 42 of the casing 18, until the disk 39 fits tightly against the upper face of the casing, at the annulus 40. A lock nut 44 serves to retain the pole piece in this position with respect to the casing.

Inside the pole piece is a thin brass sleeve 45, to protect the pole piece from rust, due to water vapor or other objectionable fluid that might be inside it, and furthermore to form a magnetic insulation for the valve stem 14 and spring 47. At the lower end of the pole piece 36 is an inset short brass sleeve 48, acting as a guide for the stem 14, and as a support or seat for the lower end of the spring 47. The spring need be only strong enough to assist the fluid-pressure in opening the valve in opposition to the weight of the pole piece and the parts moving therewith. If desired, the weight may be so proportioned to the fluid pressure and area of valve, that the spring may be dispensed with.

At the upper end of the stem, a magnetic disk 49 may be riveted, or a threaded connection may be provided, as indicated at 50, with a suitable nut lock 51 serving to lock the disk 49 in its adjusted position with respect to the seat 14. By loosening this lock nut 51 and threading the disk 49 one way or the other with respect to the stem 14, it is possible to adjust the disk upon the stem, and since this disk is the movable armature of the magnetic circuit, this adjustment serves to regulate the operation of the magnetic flux upon the valve. If this adjustment at 50, 51, is provided, the adjustment previously described between the stem 14 and disk holder 8 may be dispensed with and the stem riveted or otherwise permanently secured to the disk holder. These two adjustments may both be provided, or one or the other may be dispensed with.

A preferably non-magnetic sleeve 53 surrounds the stem 14 at its upper end, just below the disk or armature 49, and keeps the top of the spring 47 at a point below the lower surface of the armature 49. If desired, this sleeve may be integral with the armature. By preventing the spring 47 from reaching the lower surface of the armature, there is no danger that the upper coils of the spring 47 will reach a point higher than the upper surface of the pole-piece disk 38, 39, even with the valve in its upper position, and thus the spring coils cannot by any accident spread into the space between this upper surface of the pole piece disk 38, 39, and the lower surface of the armature 49. This precaution is advisable, because any extraneous matter lodging accidentally between these two surfaces might alter materially the magnetic conditions, and detract from the proper operation of the device.

The longitudinal space between the disks 24, 25 and the adjacent horizontal surfaces of the casing may be partly or entirely filled in with asbestos washers, such as those indicated at 55.

At the top of the casing, a cap 41 is screwed tightly upon the threaded portion 57, to bind the pole piece disk 38 tightly against the upper face of the casing, thus coöperating with the lower lock to prevent the passage of fluid into the magnet, and forming housing for the entire device.

This cap is centrally apertured to receive a plug 58 threaded therein, and is slotted as at 59 so that it can be rotated manually by a screw-driver. In the normal or raised position of the plug, indicated in Fig. 2 and in solid lines in Fig. 3, the lower surface thereof is at such a height as to limit the travel of the stem 14 upward to the proper extent. With the plug screwed inwardly, as shown in dotted lines in Fig. 3, this travel may be manually reduced to any desired extent, and in fact, if the plug is screwed in far enough, the stem will be forced downwardly to maintain the valve permanently closed. Thus the plug serves as a manually-operable adjusting device for regulating the travel of the valve stem or for preventing the operation of the valve at all.

The magnetic circuit may be traced, for example, downwardly through the pole piece 36, outwardly and upwardly through the shell or casing 18, and thence inwardly through the pole piece disk 39. The direct passage of lines of force from this disk 39 inwardly toward the pole piece 36 is prevented by the non-magnetic disk 38 inserted between the pole piece and the disk 39 thereon. The lines of force, therefore, traveling inwardly through the disk 39, are compelled to pass around this non-magnetic disk 38, and this they do by passing upwardly into the armature 49, inwardly toward the center of the armature, and then downwardly into the pole piece 36. This insures a large area of pole piece and disk 39 that is effective in pulling downwardly upon the armature 49, and as a result the magnetic lines of force are directed in a way to make them most useful for the purposes of the apparatus.

The armature 49 is preferably so adjusted upon the stem 14 that when the valve is closed, with the rubber disk 6 fitting tightly against the seat 5, there will be appreciable clearance between the armature 49 and the pole piece 36 and disk 39, as indicated at 60 in Fig. 3. This is to prevent the armature from sticking to the pole piece and disk when current is released, and to insure the full travel of the rubber disk 6 downwardly into firm contact with its seat 5, the latter being advisable because the fluid passing upwardly through the valve tends to unseat the valve.

The valve and its operating mechanism have been described in connection with a normally open valve, to which power is applied for the purpose of closing it. It will be obvious, however, that many if not all of the advantageous features of the invention are equally applicable to a construction in which the valve is normally closed, and is opened by the application of power thereto.

The word "Valve" as used in this specification and in the accompanying claims is intended to be generic to the various types of fluid-controlling devices; the term "electromagnet" is ordinarily intended to include devices with both fixed and movable cores; and the word "Stem" is used as indicative of any suitable type of connection between the automatically shifted element and the valve operated thereby.

In view of the above, it will be seen that the several objects of the invention are achieved, and other advantageous results attained.

As various possible embodiments might be made of the above invention and as various changes might be made in the embodiments above set forth, it is to be understood that all matter herein set forth or shown in the accompanying drawings is to be interpreted as illustrative and not in a limiting sense.

Having thus revealed my invention, I claim and desire to secure by Letters Patent of the United States:

1. An electromagnetic device, combining a magnet, a core within the magnet, a disk, a non-magnetic annulus between core and disk and flush with the disk, a casing provided at one end with a seat, means for securing the core within the casing at the other end of the casing, to bring the disk against said seat to protect the magnet windings from extraneous fluid, and a disk parallel to the first disk and movable toward and away therefrom.

2. In apparatus of the class described, in combination, a valve comprising a casing and a movable member, a magnetic shell threaded into the upper end of the valve casing, a core or pole-piece screwed into the lower end of the shell, a locking device for securing the core in place within the shell, a stem threaded into the movable member of the valve and passing through the core, a spring surrounding the stem, means for magnetically insulating the stem from the core, including a non-magnetic sleeve threaded into the lower end of the core and forming a guide for the stem, and a second sleeve adjacent the other end of the stem and movable therewith and likewise forming a guide for the stem, both of said sleeves serving as seats for the ends of the spring, a magnet wound between the shell and the core and magnetically and electrically insulated therefrom, a disk fixed to the upper end of the core and magnetically connected to the upper end of the shell but magnetically insulated from the upper end of the core, and an armature disk coaxial with the first disk and secured to the stem and movable toward and away from the first disk in response to lines of force generated by the magnet, the lines of force passing from the first disk into the armature and thence into the core.

In testimony whereof, I have signed my name to this specification this 5th day of October, 1916.

EDWIN B. LANE.